US012804389B2

(12) United States Patent
Patra et al.

(10) Patent No.: US 12,804,389 B2
(45) Date of Patent: Nov. 17, 2026

(54) SYSTEMS AND METHODS FOR MICRO-TUNNELING WITH ZERO OVERHEAD, ON-DEMAND EFFICIENT TUNNELING FOR NETWORKS

(71) Applicant: CradlePoint, Inc., Boise, ID (US)

(72) Inventors: Abhijit Patra, Saratoga, CA (US); Andrew Collins, Boise, ID (US); Prashant Sharma, San Diego, CA (US)

(73) Assignee: CradlePoint, Inc., Boise, ID (US)

( * ) Notice: Subject to any disclaimer, the term of this patent is extended or adjusted under 35 U.S.C. 154(b) by 183 days.

(21) Appl. No.: 18/524,518

(22) Filed: Nov. 30, 2023

(65) Prior Publication Data

US 2025/0184723 A1 Jun. 5, 2025

(51) Int. Cl.
*H04W 12/037* (2021.01)
*H04W 12/084* (2021.01)
*H04W 12/088* (2021.01)

(52) U.S. Cl.
CPC ....... *H04W 12/037* (2021.01); *H04W 12/084* (2021.01); *H04W 12/088* (2021.01)

(58) Field of Classification Search
CPC ... H04W 12/03; H04W 12/037; H04W 12/06; H04W 12/088; H04W 12/084; H04W 92/02; H04L 63/0281; H04L 63/029; H04L 63/0815; G06F 21/33
See application file for complete search history.

(56) References Cited

U.S. PATENT DOCUMENTS

| | | | | |
|---|---|---|---|---|
| 8,555,075 | B2 * | 10/2013 | Kessler | H04L 63/0815 726/8 |
| 12,294,650 | B2 * | 5/2025 | Coffing | H04L 63/101 |
| 12,316,609 | B2 * | 5/2025 | Jensen | H04L 63/029 |
| 2006/0100895 | A1 * | 5/2006 | Krusche | G06Q 30/00 705/53 |
| 2012/0066502 | A1 * | 3/2012 | Borneman | G06F 21/41 713/176 |
| 2012/0311614 | A1 * | 12/2012 | DeAnna | H04L 67/10 719/328 |
| 2013/0104207 | A1 * | 4/2013 | Kroeselberg | H04W 92/02 726/6 |
| 2017/0099176 | A1 * | 4/2017 | Jain | H04L 41/046 |
| 2018/0248884 | A1 * | 8/2018 | Karunakaran | G06F 21/33 |
| 2019/0220361 | A1 * | 7/2019 | Mageswaran | G06F 11/302 |
| 2021/0067346 | A1 * | 3/2021 | Hergesheimer | H04L 9/3247 |
| 2021/0097554 | A1 * | 4/2021 | Manicka | G06Q 30/0185 |
| 2022/0224535 | A1 * | 7/2022 | Coffing | H04L 63/205 |
| 2023/0353392 | A1 * | 11/2023 | Hockey | H04L 9/3273 |

FOREIGN PATENT DOCUMENTS

| | | | | |
|---|---|---|---|---|
| EP | 3706022 A2 | * | 9/2020 | H04L 63/20 |
| WO | WO-2023220304 A1 | * | 11/2023 | H04L 61/2575 |

* cited by examiner

*Primary Examiner* — Lizbeth Torres-Diaz
(74) *Attorney, Agent, or Firm* — Parsons Behle & Latimer

(57) ABSTRACT

Systems and methods for secure communications over a network using micro-tunneling, including assigning a signed identity to a site, the site including a router in communication with a device over a control plane, and verifying the signed identity received from the site at a gateway node in communication with the router over the control plane. The device initiating a transport flow inserts the signed identity for the site in a metadata field of a packet in the transport flow and the gateway node verifies the signed identity before allowing the transport flow.

16 Claims, 2 Drawing Sheets

SYSTEMS AND METHODS FOR MICRO-TUNNELING WITH ZERO OVERHEAD, ON-DEMAND EFFICIENT TUNNELING FOR NETWORKS

FIELD OF THE DISCLOSURE

This disclosure relates generally to network security. In particular, this disclosure relates to systems and methods for providing a micro-tunneling solution for network security.

BACKGROUND

Typical communication and computing networks need security measures and policies to reduce the network attack surface, ensure no implicit trust, and help prevent damaging lateral movements. A fundamental aspect of security solution is tunneling data between two network elements over public network. Many standard solutions exist for tunneling such as Layer 2 (e.g., "L2" or data link layer) and Layer 3 (e.g., "L3" or network layer) tunneling solutions (e.g., IPsec, secure socket shell, Virtual extensible Local Area Network, L2 tunneling protocol, etc.) exist to address these needs. However, most of these existing solutions fall short of addressing the scaling needs of many networks (e.g., mobile broadband, WWAN, and the like) which can contain a multitude of physical/virtual sites, clients, and gateways. Similarly, existing solutions lack link bandwidth efficiency and increase overhead.

Other drawbacks, inefficiencies, and inconveniences also exist with current systems and methods.

SUMMARY

Accordingly, disclosed embodiments address the above and other drawbacks, inefficiencies, and inconveniences that exist with current systems and methods. For example, Cradlepoint, of Boise, Idaho, provides Netcloud Exchange (NCX) as a network based on modern zero trust principles that significantly reduce the network attack surface, ensure no implicit trust, and help prevent damaging lateral movements. Additionally, the herein disclosed micro tunnel solutions provide link bandwidth efficiency and improve system scalability via on demand tunneling. One aspect of an NCX network is the ability to tunnel data between various components in an NCX network like physical/virtual sites, clients, and gateways.

Disclosed embodiments include Cradlepoint's NCX micro-tunneling solution that addresses not only tunneling, but also the ability to carry metadata to support zero trust principles in an NCX network. In some embodiments of micro-tunnel solutions, the life cycle of micro-tunnels in an NCX network are managed by a control plane component that has visibility across every component in the NCX network.

Disclosed embodiments include a network for secure communications using micro-tunneling, the network having a site including a router in communication with a device over a control plane and wherein the router includes program instructions for assigning a signed identity to the site, and a gateway node in communication with the router over the control plane and wherein the gateway node includes program instructions for verifying the signed identity received from the site, and wherein the device initiating a transport flow inserts the signed identity for the site in a metadata field of a packet in the transport flow and the gateway node verifies the signed identity before allowing the transport flow.

In some embodiments the signed identity comprises a token. In further embodiments the token comprises a JavaScript Object Notation (JSON) web token.

In some embodiments the signed identity is assigned using security assertion markup language (SAML).

In some embodiments the gateway node verifies the signed identity using a key. In further embodiments the key comprises a public key.

In some embodiments the metadata field of the packet in the transport flow is encrypted.

In some embodiments the signed identity can be revoked by a network administrator.

Also disclosed is a method for secure communications over a network using micro-tunneling, the method including assigning a signed identity to a site, the site having a router in communication with a device over a control plane, and verifying the signed identity received from the site at a gateway node in communication with the router over the control plane, wherein the device initiating a transport flow inserts the signed identity for the site in a metadata field of a packet in the transport flow and the gateway node verifies the signed identity before allowing the transport flow.

Other embodiments also exist.

Figure 1:
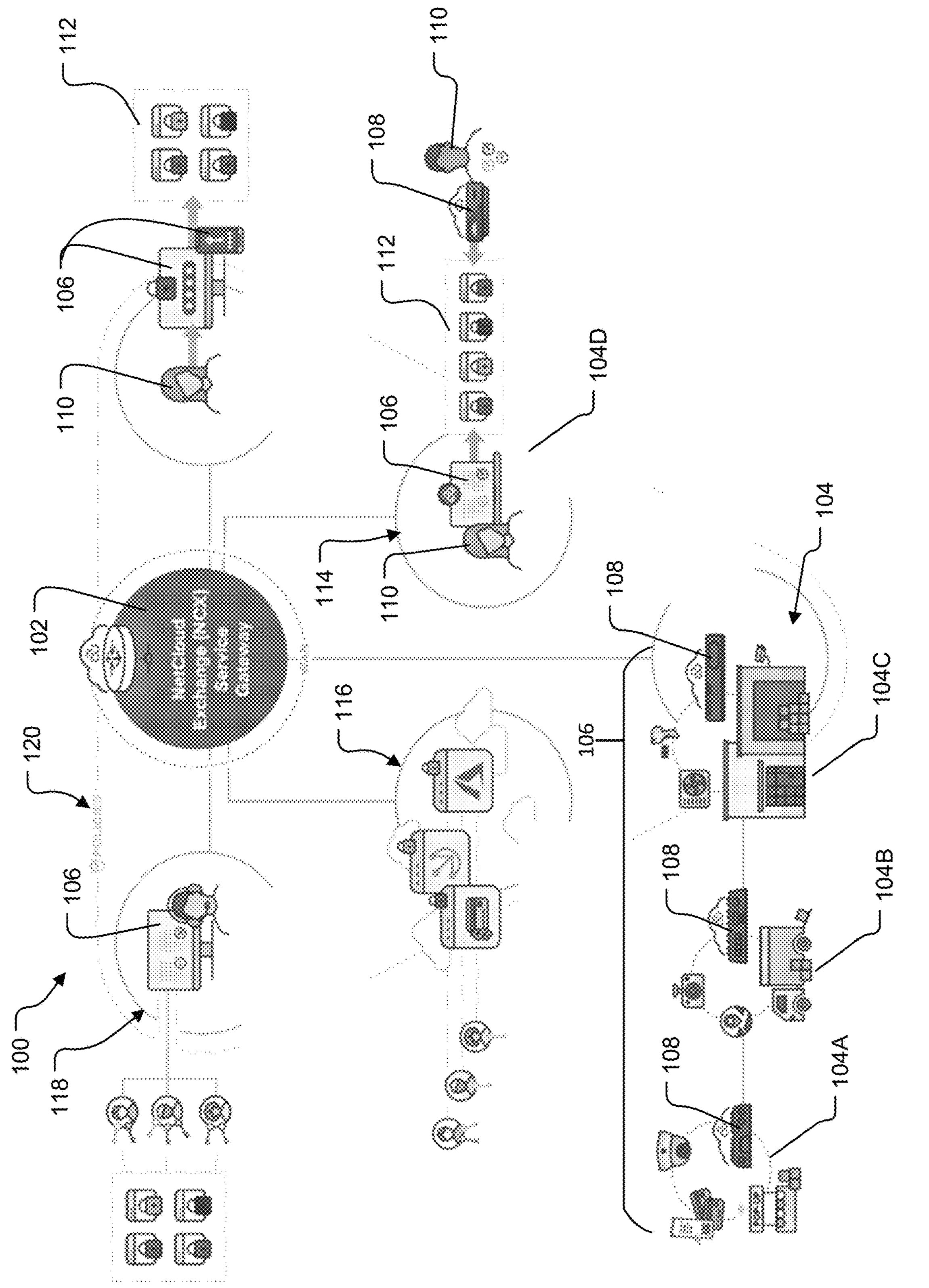
FIG. 1 is a schematic illustration of an exemplary NCX network in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a schematic illustration of an exemplary NCX network 100 in accordance with disclosed embodiments. As illustrated for networks, such as NCX network 100, with expanded perimeters and with users and resources outside of traditional enterprise boundaries, it is desirable to use zero trust architecture and principles to protect the enterprise's data, devices, and assets. A zero trust architecture eliminates default access by giving users and devices access only to the resources they need to do their job. As illustrated NCX network 100 includes one or more service gateways 102 to, among other things, provide access and allow data flow between various parts of the NCX network 100. As also indicated schematically a number of sites 104 may access NCX network 100. For example, pop-up sales kiosk 104A, delivery vehicles 104B, and warehouses 104C may be remotely distributed (and, in some cases, mobile) sites 104 that access NCX network 100. While FIG. 1 illustrates primarily commercial sites 104, this disclosure is not so limited and other applications and environments, such as governmental (e.g., firefighters, police), healthcare (e.g., hospitals, EMS), and the like, may also implement a NCX network 100.

Each site 104 will typically include one or more devices 106 such as, but not limited to, point-of-sale devices, cameras, GPS units, HVAC systems, barcode scanners, smartphones, laptop computers, desktop computers, tablets, televisions, smart-speakers, internet-of-things (IoT) devices, appliances, and the like, for communicating data and information over the NCX network 100. Enterprises can establish secure connections across distributed sites 104 and the users 110 and IoT devices within them using site-based access policies 120. As also indicated schematically, users 110 and devices 106 at the various sites 104 may communicate over NCX network 100 using a variety of routers, modems, switches, hubs, and the like, (collectively, "routers" or "router" 108).

As also indicated schematically, an identity provider 112, which may be unique to each enterprise, may be implemented to bring increased visibility and control to the NCX network 100 by verifying and authenticating users 110 before they can access the NCX network 100. In this manner, NCX network 100 can extend secure, isolated user-to-resource access to users 110 accessing the NCX network 100 from anywhere through a client 114. As used herein client 114 also comprises another type of site 104D for remote workers or the like. As indicated, access to remote users 110 may be through a router 108.

Embodiments of NCX network 100 also provide a variety of applications 116 which may be cloud-based (e.g., Microsoft Azure, AWS IoT Greengrass, etc.). As also indicated schematically, NCX network 100 administrators 118 may apply policies 120 over the NCX network 100. In some embodiments, rather than authenticating users 110 to NCX network 100, users 110 are authenticated directly to specific resources. This increases security and prevents lateral movement. Other features and advantages also exist.

Figure 2:
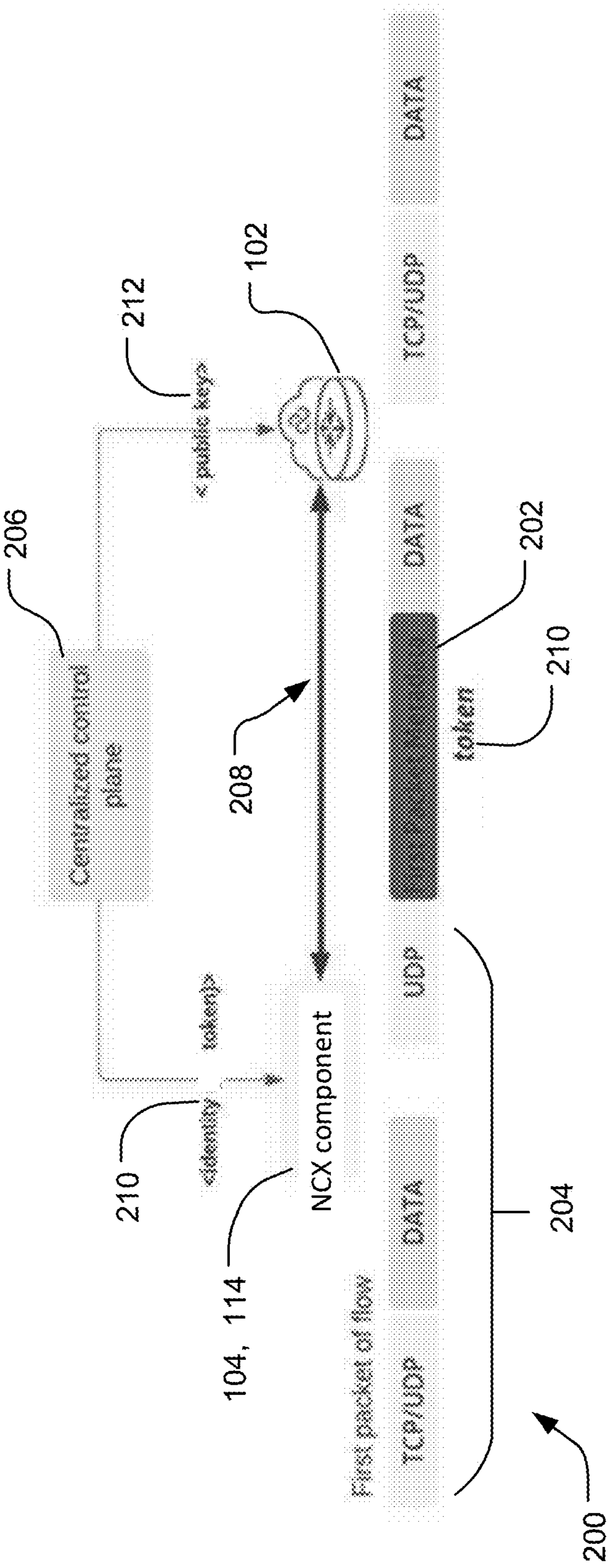
FIG. 2 is a schematic illustration of an example of the flow originating from NCX network device in accordance with disclosed embodiments.

FIG. 2 is a schematic illustration of an example of the flow 200 originating from NCX network 100 device 106. In general, disclosed embodiments of a NCX network 100, zero trust, micro-tunnel solutions provide a framework to pass additional information in line within a transport protocol (e.g., TCP, UDP, ICMP) connection between two NCX network 100 components (e.g., service gateway 102, client 114, sites, 104, etc.). Embodiments of the zero-trust, micro tunnel solution consist of logic in NCX network 100 components (e.g., service gateway 102, client 114, sites 104, etc.) to intercept transport flows 200 and embed/remove metadata 202 after transport header 204. For example, in site 104 the tunnel end point is router 108 and in client 114 the tunnel end point is a laptop or the like (e.g., a device 106) that has NCX client software (e.g., program or processor instructions) installed. Embodiments of the solution also include a centralized control plane 206 to manage micro tunnel 208 operation in NCX network 100 components (e.g., service gateway 102, client 114, sites, 104, etc.).

An important aspect of embodiments of the disclosed zero trust, micro tunnel solution is that a NCX gateway node 102 allows traffic exclusively from trusted endpoints. Disclosed embodiments address this is as follows. Control plane 206 ensures that network end points (104, 114, etc.) are provisioned with unique signed identity 210 (e.g., user token, certificate, etc.) via various mechanisms (e.g., security assertion markup language (SAML) or the like). Control plane 206 also configures each NCX gateway node 102 with a key to verify the above identity.

In some embodiments control plane 206 ensures that the identity 210 is rotated and can be revoked by an administrator 118. The NCX device 106 (or 104, 114, etc.) initiating transport flow 200 adds its identity 210 in metadata field 202 of first packet in flow 200. As described herein, this section of metadata 202 is encrypted to prevent eavesdropping. The other side of the micro tunnel 208 (e.g., service gateway 102) will verify the identity 210 before allowing the flow 200.

As many of NCX network 100 components (e.g., site 104, client 114, gateway 102, etc.) are part of a public network, the herein disclosed systems and methods allow these components to talk to each other over an encrypted and authenticated tunnel 208. Sensitive fields in metadata 202 are encrypted and replay protection is also supported.

As an exemplary embodiment also illustrated in FIG. 2, control plane 206 configures NCX component 104, 114, etc., with a signed identity 210 that comprises a binary encoded signed token 210. Token 210 payload consists of NCX component (104, 114, etc.) identity. NCX component (104, 114, etc.) adds token 210 as part of encrypted section of first packet metadata 202. The other end of micro tunnel 208 (e.g., NCX gateway component 102) first verifies the token 210 key signature using a configured public key 212. Flow 200 is rejected if identity cannot be verified. In some embodiments signed identity 210 may also be a JSON web token (jwt token) or the like. Other embodiments are also possible.

As those of ordinary skill in the art having the benefit of this disclosure will understand, disclosed embodiments enable methods for stateless policy evaluation per flow 200. For example, an enterprise typically deploys security solutions (like Cradlepoint NCX) to monitor traffic and apply access control and security policies (e.g., policies 120). In an NCX gateway node 102, every new transport flow 200 is matched to a set of configured policies 120, and flow 200 is accepted only if policy 120 allows it. Such a mechanism to enforce policies 120 in gateway 102 is an important aspect of the disclosed security solution.

A typical rule in many policies 120 consists of a set of criteria (like user attribute, device profile, source/destination site, source/destination fqdn/ip, application/web category, etc.). To match a rule, flow 200 attributes should match all the criteria of the rule.

The disclosed zero trust, micro tunnel approach simplifies policy 120 evaluation in gateway 102. Certain flow 200 attributes are added in the packet metadata 202. This is typically in first packet metadata 202 but can also be in metadata of subsequent packet. Advantages include that because end points (104, 114, etc.) originating flow 200 embed attributes needed for policy 120 evaluation in flow 200 itself, there is no need of a side channel mechanism to distribute these attributes to gateways 102.

Additionally, policy 120 rule evaluation in gateway 102 is much faster as it does not need additional lookups to find flow 200 attributes. Likewise, the micro tunnel 208 control plane component 206 is responsible to identify and provision attributes that end points (104, 114, etc.) include in metadata 202 section. This includes, but is not limited to, user 110 attributes (e.g., username, department, role, etc.) identified by authenticating NCX network 100 users 110 and attributes of a device 106 (e.g., virus scan result, corporate certificate presence, etc.) being used by user 110.

Although various embodiments have been shown and described, the present disclosure is not so limited and will be understood to include all such modifications and variations would be apparent to one skilled in the art.

What is claimed is:

1. A network for secure communications using micro-tunneling, the network comprising:

an enterprise site comprising a first router in communication with a first device over a control plane and wherein the first router includes program instructions for assigning a unique signed identity associated with the enterprise to the first device;

a second router in communication with a second device over the control plane and wherein the second router includes program instructions for assigning a unique signed identity associated with the enterprise to the second device; and a gateway node in communication with the first router and the second router over the control plane and wherein the gateway node includes program instructions for verifying the unique signed identity associated with the enterprise and received from the first device and the second device; and wherein each of the first device and the second device upon initiating a transport flow inserts the unique signed identity associated with the enterprise in a metadata field of a packet in the transport flow and the gateway node verifies the unique signed identity associated with the enterprise before allowing the transport flow.

2. The network for secure communications of claim 1 wherein the unique signed identity associated with the enterprise comprises a token.

3. The network for secure communications of claim 2 wherein the token comprises a JavaScript Object Notation (JSON) web token.

4. The network for secure communications of claim 1 wherein the gateway node verifies the unique signed identity associated with the enterprise using a key.

5. The network for secure communications of claim 4 wherein the key comprises a public key.

6. The network for secure communications of claim 1 wherein the metadata field of the packet in the transport flow is encrypted.

7. The network for secure communications of claim 1 wherein the unique signed identity associated with the enterprise can be revoked by a network administrator.

8. The network for secure communications of claim 1 wherein the unique signed identity associated with the enterprise is assigned using security assertion markup language (SAML).

9. A method for secure communications over a network using micro-tunneling, the method comprising:

assigning a unique signed identity associated with an enterprise to a first device at a site, the site comprising a router in communication with the first device over a control plane;

assigning the unique signed identity associated with the enterprise to a second device at the site; and verifying the unique signed identity associated with the enterprise and received from the site at a gateway node in communication with the router over the control plane;

wherein each of the first device and the second device upon initiating a transport flow inserts the unique signed identity associated with the enterprise for the site in a metadata field of a packet in the transport flow and the gateway node verifies the unique signed identity before allowing the transport flow.

10. The method for secure communications of claim 9 wherein the unique signed identity associated with the enterprise comprises a token.

11. The method for secure communications of claim 10 wherein the token comprises a JavaScript Object Notation (JSON) web token.

12. The method for secure communications of claim 9 wherein the unique signed identity associated with the enterprise is assigned using security assertion markup language (SAML).

13. The method for secure communications of claim 9 wherein the gateway node verifies the unique signed identity associated with the enterprise using a key.

14. The method for secure communications of claim 13 wherein the key comprises a public key.

15. The method for secure communications of claim 9 wherein the metadata field of the packet in the transport flow is encrypted.

16. The method for secure communications of claim 9 wherein the unique signed identity associated with the enterprise can be revoked by a network administrator.

* * * * *